United States Patent [19]
Allen et al.

[11] Patent Number: 5,959,841
[45] Date of Patent: Sep. 28, 1999

[54] MODULAR COMPUTER CHASSIS WITH EXTRACTOR DEVICE MOUNTED TO THE HOUSING

[75] Inventors: Joseph R. Allen, Tomball; B. Tod Cox; James P. Shero, both of Houston, all of Tex.

[73] Assignee: Compaq Computer Corp., Houston, Tex.

[21] Appl. No.: 08/777,816

[22] Filed: Dec. 31, 1996

[51] Int. Cl.[6] .............................. G06F 1/16; H05K 5/00
[52] U.S. Cl. ........................................ 361/725; 312/223.2
[58] Field of Search .................... 361/683, 685, 361/686, 724–727, 732, 754; 312/223.1, 223.2, 223.3; 364/708.1; 439/155–160; G06F 1/16

[56] References Cited

U.S. PATENT DOCUMENTS

| | | | |
|---|---|---|---|
| 5,051,868 | 9/1991 | Leverault et al. | 361/395 |
| 5,136,468 | 8/1992 | Wong et al. | 361/393 |
| 5,154,456 | 10/1992 | Moore et al. | 292/162 |
| 5,162,976 | 11/1992 | Moore et al. | 361/393 |
| 5,224,019 | 6/1993 | Wong et al. | 361/393 |
| 5,224,024 | 6/1993 | Tu et al. | 364/429 |
| 5,277,615 | 1/1994 | Hastings et al. | 439/377 |
| 5,332,306 | 7/1994 | Babb et al. | 312/334.16 |
| 5,340,340 | 8/1994 | Hastings et al. | 439/64 |
| 5,379,184 | 1/1995 | Barraza et al. | 361/685 |
| 5,392,192 | 2/1995 | Dunn et al. | 361/683 |
| 5,397,176 | 3/1995 | Allen et al. | 312/223.2 |
| 5,400,214 | 3/1995 | Antonuccio et al. | 361/683 |
| 5,406,453 | 4/1995 | Cusato et al. | 361/733 |
| 5,460,441 | 10/1995 | Hasting et al. | 312/298 |
| 5,558,528 | 9/1996 | Cheng et al. | 439/160 |
| 5,587,877 | 12/1996 | Ryan et al. | 361/683 |
| 5,593,219 | 1/1997 | Ho | 312/263 |
| 5,600,538 | 2/1997 | Xanthopoulos | 361/683 |
| 5,634,803 | 6/1997 | Cheng et al. | 439/157 |
| 5,644,470 | 7/1997 | Benedict et al. | 361/686 |
| 5,684,671 | 11/1997 | Hobbs et al. | 361/683 |

*Primary Examiner*—Lynn D. Feild
*Attorney, Agent, or Firm*—Jenken & Gilchrist

[57] ABSTRACT

A modular computer chassis configurable for both rack mounting and free standing use includes a housing with a multiple compartments for receiving computer devices and peripherals therein. The housing further includes side access panels and a top access panel, each being attachable and removable from the frame of the chassis without tools. The frame of the modular computer chassis is configured with slots to receive corresponding tabs on each of the side and top panels which facilitate the quick installation and removal of the side and top panels from the frame of the chassis. Multiple tool-less fasteners are used to further secure side and top covers to the frame of the chassis.

19 Claims, 10 Drawing Sheets

5,959,841

MODULAR COMPUTER CHASSIS WITH EXTRACTOR DEVICE MOUNTED TO THE HOUSING

FIELD OF THE INVENTION

The present invention relates to a computer chassis for free standing or rack mounting use, and more particularly, but not by way of limitation, to a computer chassis constructed with a modular mounting configuration and adapted with tool-less access for effecting ease in the installation or removal of computer components therein.

BACKGROUND OF THE INVENTION

Early computer designs generally included a chassis with a plurality of individual components and assemblies mounted therein and connected to one another by means of wires, cables, brackets, nuts, bolts and the like. A major computer design advance occurred with the advent of printed circuit boards, integrated circuits and modular component assemblies. The printed circuit boards were, for example, formed of lightweight material and housed a myriad of components which were electrically interconnected with the component assemblies through wiring harnesses. The wiring harnesses and hard wire connections were subsequently replaced by technologically advanced connectors used for integrally coupling the individual components to each other and to other circuitry in the computer.

In the design of electronic equipment, the use of connectors, modular components, and specialized hardware has permitted key components and printed circuit boards to be efficiently added and removed. Such ease in the addition and deletion of computer components and printed circuit boards has facilitated assembly repair, upgrade, and/or changes in functionality.

Computer reliability and serviceability are also valuable design aspects. Originally, a rule of practice in the maintenance of electrical circuitry, such as computer hardware, was that of always turning the power to the computer off before components or printed circuit boards were added or removed from the computer chassis or support frame. Recent innovations have addressed the desirability to insert and remove modular components and printed cards from electrical equipment, such as computer hardware, when the computer is electrically connected and operational, i.e. "hot." This is now possible for hot pluggable hard drives, and in these cases, the power may be disconnected from only the connector of the drive or modular component to be inserted and removed while allowing the adjacent components to remain "hot."

Removable computer components today include disc drives, drive cages, fans, power supplies, system I/O modules, processor boards, and other subassemblies. As referenced above, the removability of computer components allows for better overall serviceability of the computer system, which is a distinct advantage to both the user and the maintenance technician. A defective power supply in the main or central computer generally requires prompt replacement in order to limit downtime. It is for this reason that modular components and connectors facilitate prompt replacement and are thus popular in many computer designs.

The modularity of computer systems is thus recognized as an important design consideration. As referenced above, modules can be removed and examined for operability or other purposes much easier than permanently mounted fixtures within a computer chassis. Because computers provide an integral part of most business operations, it is of utmost importance to maintain the reliability and integrity of the computer system. When the various elements of a computer can be easily removed in a modular form, they can also be replaced to maintain the operational status of the computer.

Many current design approaches for these types of modular computer components utilize metal brackets secured with screws to the computer chassis or support housing to secure and maintain the component therein. This design presents many problems, as the brackets are often difficult to access and require extra time for alignment during the installation of the component within the component connector and the housing. Similarly, extra time is needed to remove and store all of the screws prior to the removal of the component from the connector and the housing. Additionally, tools are typically needed to be able to install and remove the brackets from the component and the housing, and the component must be moved relative to the connector in order to install or remove it.

Therefore it is desirable to have a modular computer chassis that can be serviced and upgraded with minimum tools with respect to not only the addition of computer components, but also with the removing and installing of the access panels.

SUMMARY OF THE INVENTION

The present invention overcomes the above identified problems as well as other shortcomings and deficiencies of existing technologies by providing a computer chassis constructed with a modular mounting configuration and adapted with tool-less access for effecting ease in the installation or removal of computer components therein.

The present invention further provides a modular computer chassis configurable for both rack mounting and free standing use includes a housing with a multiple compartments for receiving computer devices and peripherals therein. The housing further includes side access panels and a top access panel, each being attachable and removable from the frame of the chassis without tools. The frame of the modular computer chassis is configured with slots to receive corresponding tabs on each of the side and top panels which facilitate the quick installation and removal of the side and top panels from the frame of the chassis thereby providing access to devices installed in the multiple compartments of the computer chassis. Multiple tool-less threaded fasteners are used to further secure side and top covers to the frame of the chassis.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
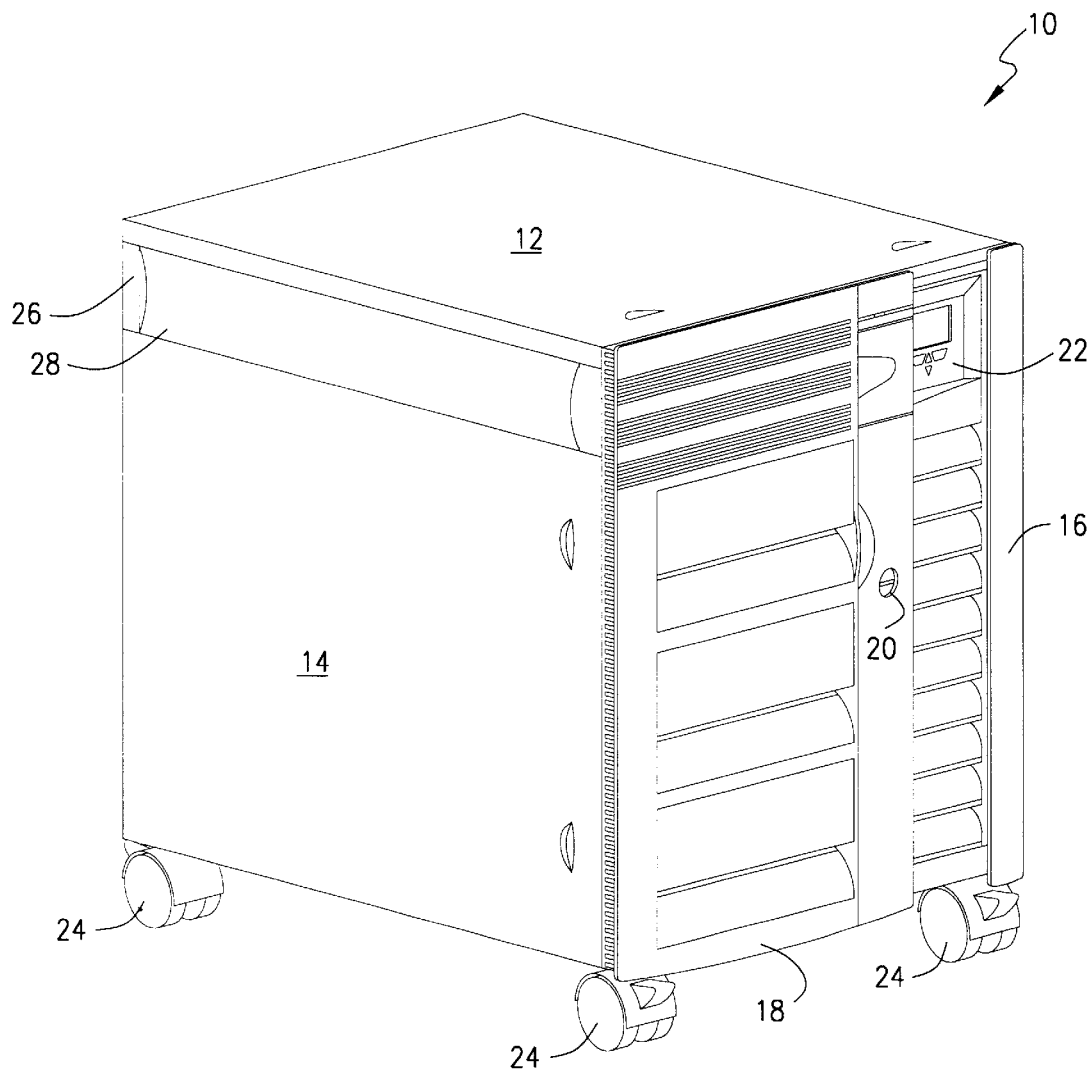
FIG. 1 is a frontal, left side perspective view of a computer chassis constructed in accordance with the principles of the present invention.

Referring now to the drawings wherein like or similar elements are designated with identical reference numerals throughout the several views, and wherein the various elements depicted are not necessarily drawn to scale, and in particular, to FIG. 1, there is shown a perspective view of a computer chassis 10 constructed in accordance with the principles of the present invention. As illustrated, computer chassis 10 includes a top cover or panel 12, a side panel or cover 14, and front doors 16 and 18. Front doors 16 and 18 are hingedly attached to computer chassis 10 and be installed and removed therefrom without tools. Front doors 16 and 18 are lockable in the closed position with lock 20. Panels 12 and 14 will be described in more detail herein below. Computer chassis 10 further includes a display 22 for displaying computer operation and status information. In this exemplary embodiment, computer chassis 10 is both mobile and rack mountable.

Still referring to FIG. 1, casters 24 are attached to the base of computer chassis 10 and are for facilitating the mobility of computer chassis 10. To facilitate rack mounting, computer chassis 10 includes recesses on both sides thereof, such as recess 26. As illustrated in FIG. 1, computer chassis 10 is configured for free standing mobile use. When computer chassis 10 is configured for use in an electronic rack enclosure system, casters 24 are removed from the base of computer chassis 10, filler plate 28 is removed from recess 26, and a rack slide (see FIGS. 6 & 7) is attached in the recess to facilitate the mounting of computer chassis 10 into a rack mount system. Filler plate 28 can be attached to and removed from recess 26 without tools, such as by using a snap fit configuration. This further facilitates the easy conversion of computer chassis 10 between a portable configuration and a rack mount configuration. A more detailed description of computer chassis 10 configured for rack mounting is be given herein below.

Figure 2:
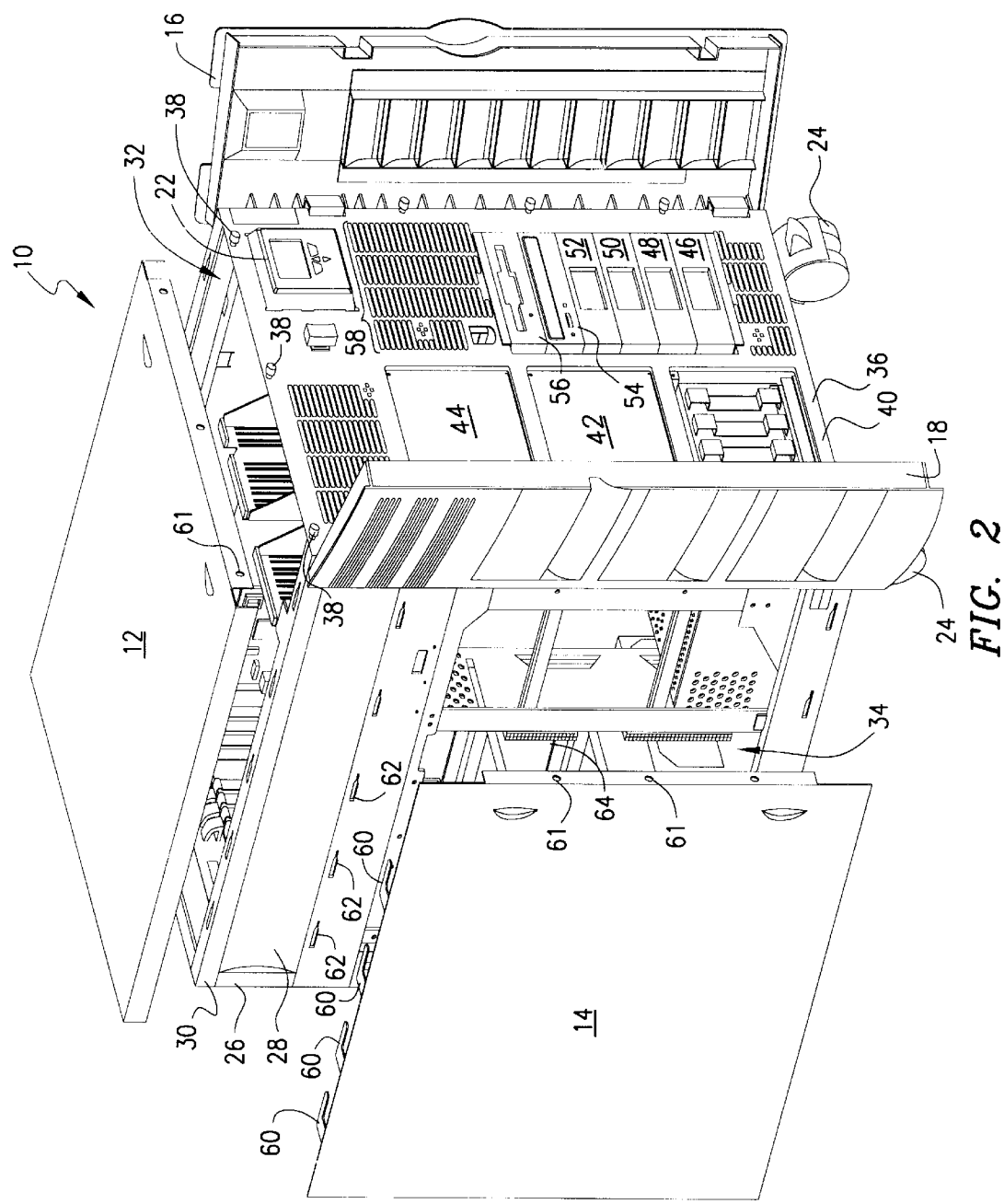
FIG. 2 is a frontal, left side perspective view of the computer chassis of FIG. 1 and is also shown partially exploded to illustrate the operation and assembly thereof.

Referring now to FIG. 2, there is shown a frontal, left side perspective view of computer chassis 10 as similarly shown in FIG. 1, illustrating the removal of cover panels 12 and 14, and the opening of front doors 16 and 18. As illustrated computer chassis 10 is constructed with a frame 30 which, along with cover panels 12 and 14 and front panel 36 define compartments 32 and 34 therein. As further illustrated in FIG. 2, front doors 16 and 18 can be opened to provide accessability to a front panel 36. Front panel 36 is inseparably attached to the frame 30 of computer chassis 10 and includes a number of openings, ports or module slots to receive multiple computer components such as computer hard drives, floppy drives, cd-rom drives and the like. In this exemplary embodiment front panel 36 is configured with three hard drive cage bays 40, 42 and 46, five half height slots 46, 48,50, 52 and 54, and one one-third height slot 56. Each of the hard drive cage bays 40, 42 and 46 can receive drive cages into which 4 half-height hot pluggable drives or 6 one-third height hot pluggable drives (as illustrated in slot 40) can be installed. As further illustrated slots 46–56 are configured to receive drives such as floppy disk drive in slot 56 and a CD-ROM drive in slot 54.

Front panel 36 further includes air vent slots such as slots 58 to provide ventilation for adequate airflow to the various computer components installed in the internal compartments of computer chassis 10.

Still referring to FIG. 2, top cover panel 12 and side cover panel 14 are removably attachable to frame 30. It is preferred that panels 12 and 14 be attachable and removable without tools to facilitate the quick and easy access to the compartments of computer chassis 10. In this exemplary embodiment cover panels 12 and 14 are attached to frame 30 using a tab and slot configuration, such as tabs 60 extending from side cover panel 14 and corresponding slots 62 on frame 30. In operation, tabs 60 are inserted into the wide portion of the corresponding slots, whereby the cover is then shifted so that the tabs 60 engage the more narrow portions of slots 62. This ensures proper alignment and installment of cover panels 12 and 14. Tool-less fasteners, such as threaded screws 38 are then used to secure cover panels 12 and 14 to the computer chassis 10. When the covers 12 and 14 have been properly installed, holes 61 in the cover panels are in alignment with threaded screws 38. Threaded screws 38 are then rotated into holes 61, thereby securing covers 12 and 14 to computer chassis 10. Although fasteners 38 are illustrated as tool-less threaded screws, it is contemplated to be within the scope of this invention that other types of tool-less fasteners could be used, such as quarter turn fasteners and the like. The removal of top cover panel 12 allows access to compartment 32, and similarly the removal of side cover 14 permits access to compartment 34.

As further depicted in FIG. 2, a DC power back plane interface board 64 is positioned within compartment 34 and is used to distribute power to the components in computer chassis 10.

Figure 3:
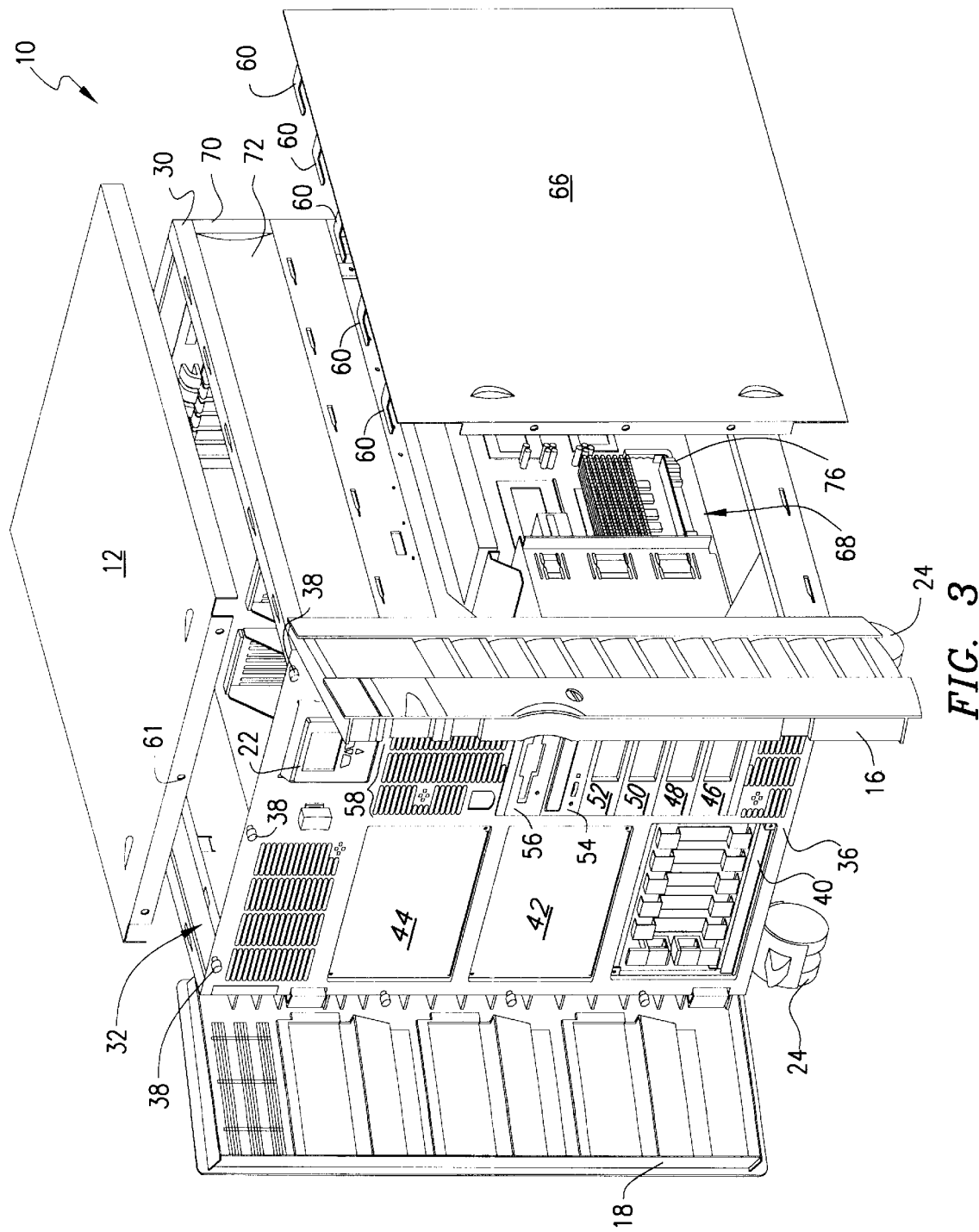
FIG. 3 is a frontal, right side perspective view of the computer chassis of FIG. 1 shown partially exploded to further illustrate the operation and assembly thereof.

Referring now to FIG. 3, there is depicted a frontal, right side perspective view of computer chassis 10. As illustrated, computer chassis 10 includes a second side panel cover 66 which is attachable in a similar manner to side panel cover 14 as described herein above. It is preferred that side panel cover 66 and side panel cover 14 be configured to be interchangeable, thereby reducing production costs by only having to produce one type of side cover panel.

As further depicted in FIG. 3, frame 30 of computer chassis 10 along with side cover panel 66 forms compartment 68. Positioned above compartment 68 on computer chassis 10 is a recess 70 and a filler plate 72. As similarly described herein above, when computer chassis 10 is configured for use in an electronic rack enclosure system, casters 24 are removed from computer chassis 10, filler plate 72 is removed and a rack slide (see FIGS. 6 & 7) is attached in the recess 70. A more detailed description of computer chassis 10 in rack mode will be given herein below in FIGS. 6 and 7.

Figure 4:
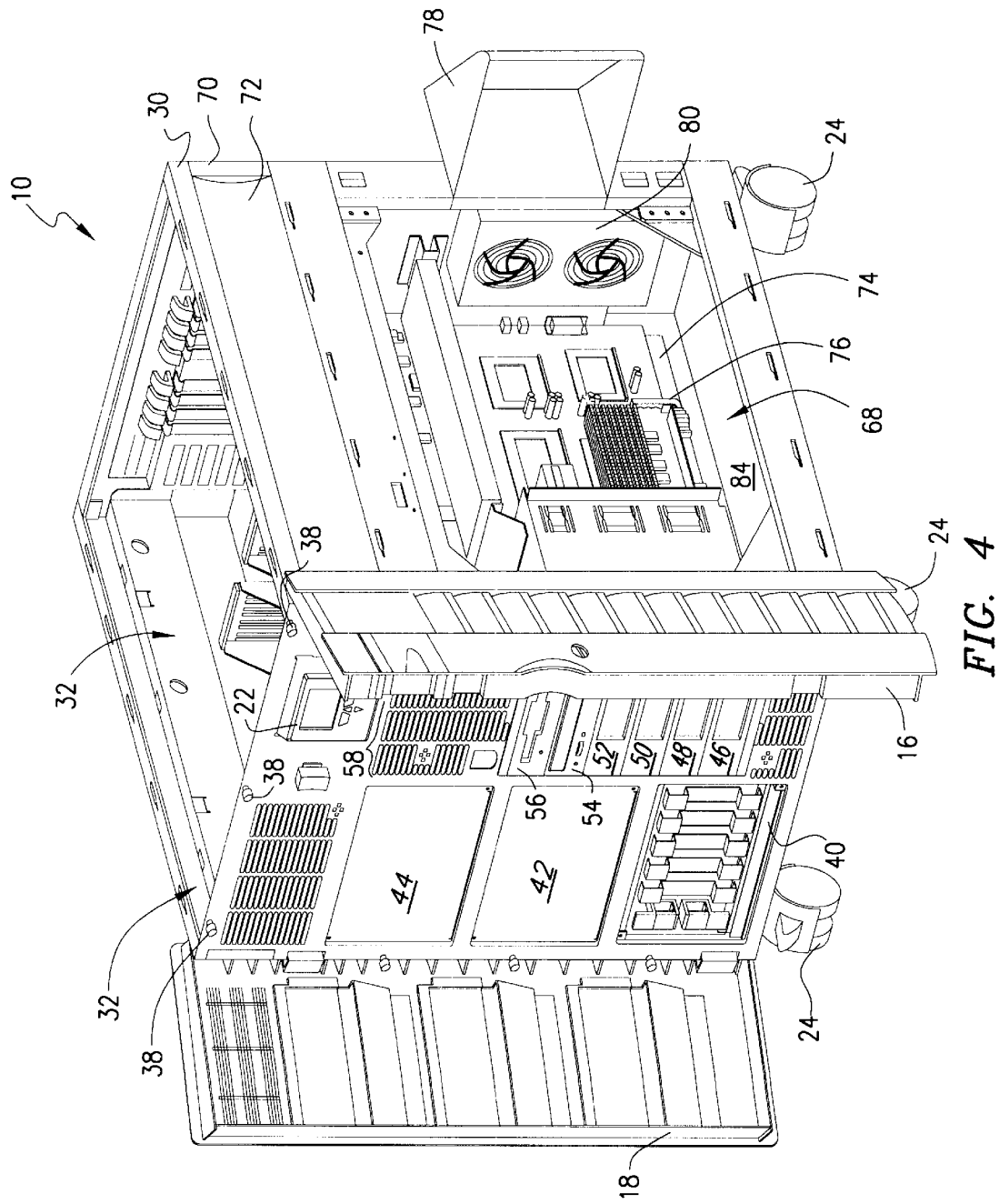
FIG. 4 is frontal, right side perspective view of the computer chassis of FIG. 1 with the top and right side panels removed and the front doors open to further illustrate the assembly thereof.

Referring now to FIG. 4, there is illustrated a frontal, right side perspective view of computer chassis 10 as similarly shown in FIG. 3 with top cover panel 12 and side cover panel 66 removed. As depicted in this exemplary embodiment, compartment 32 of computer chassis 10 is formed in a general horizontal configuration and is designed to receive multiple computer I/O interface components with access to the I/O ports of the components being positioned facing the rear of computer chassis 10. It is preferred that computer I/O interface components be installable, securable and removable without tools to also facilitate the easy and quick installment and repair of the components.

As further illustrated, compartment 68 includes a processor printed circuit board 74 installed therein. In this exemplary embodiment PCB 74 orthogonally interconnects with one of the modules installed in compartment 32. This direct interconnection maintains minimal bus length between the compartments and the modules. A printed circuit board insertion/removal mechanism 76 is pivotally mounted to PCB 74 and engages a hole or featured recess in wall 82 of frame 30. When the handle portion of PCB insertion/removal mechanism 76 is pivoted away from PCB 74, PCB 74 disengages with the component in compartment 32, and similarly when pushed toward PCB 74, PCB 74 is mated and secured with the corresponding component in compartment 32. Printed circuit board insertion/removal mechanism 76 is described in more detail in FIGS. 10 and 11.

Figure 5:
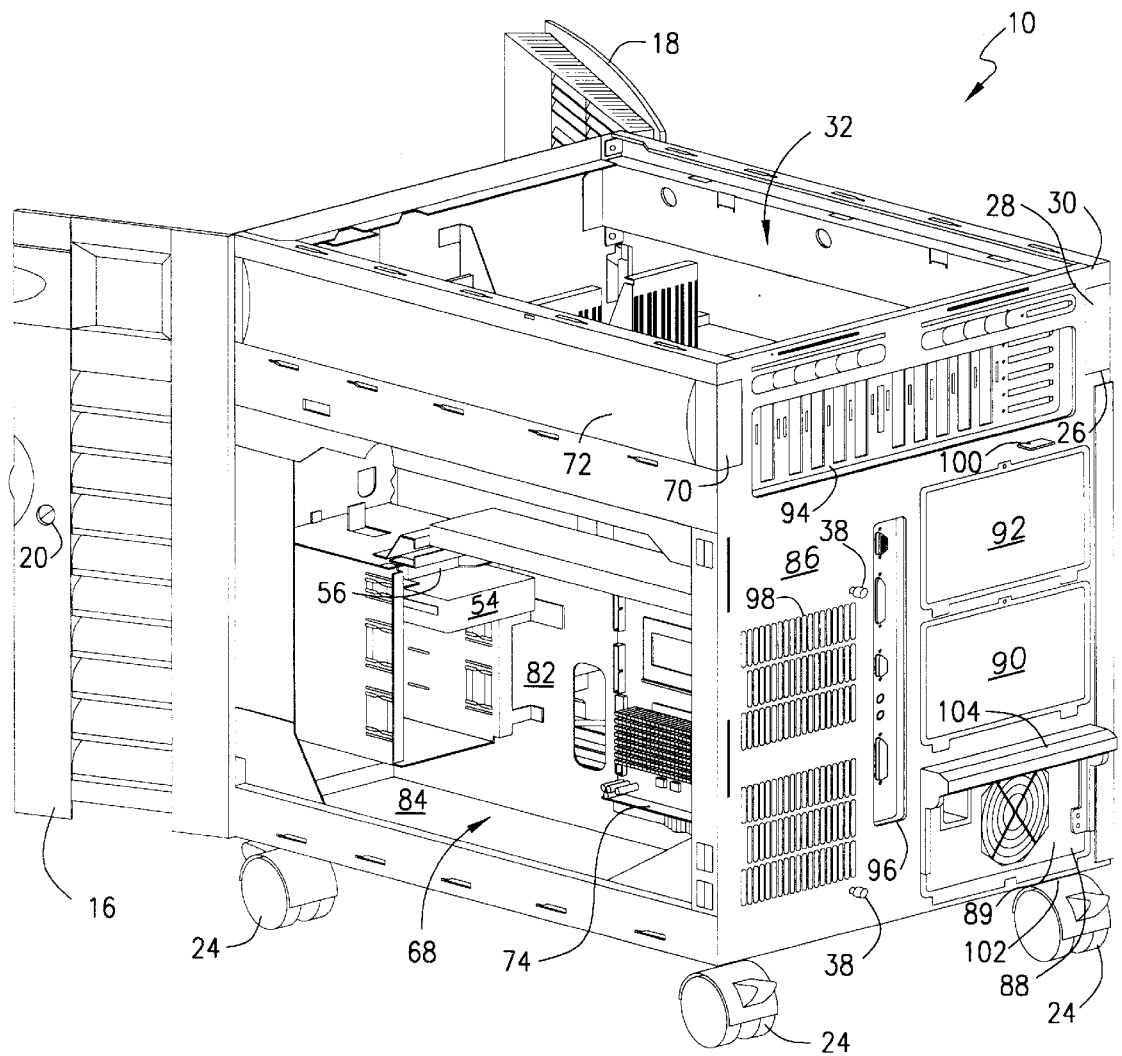
FIG. 5 is a rear, right side perspective view of the computer chassis of as similarly shown in FIG. 4.

Still referring to FIG. 4, computer chassis 10 includes a cooling fan assembly 80 mounted on a rear wall of frame 30 and is for drawing air through compartment 68 to help maintain a proper operating temperature for the components therein. Cooling fan assembly 80 is also installed, secured and removed without tools by utilizing threaded hand screws 38 (FIG. 5). As with covers 12, 14 and 66, it is contemplated that other types of tool-less fasteners could be used, such as quarter turn fasteners and the like.

As further depicted in FIG. 4, computer chassis 10 includes an air vent hood 78 pivotally mounted to frame 30 and is configured to be installable and removable with respect to frame 30 without tools. Air vent hood 78 can be swung out of compartment 68 to provide access to the components therein. In operation, air vent hood 78 is rotated into compartment 68 over fans 80 to direct more air flow over specific temperature sensitive areas of PCB 74, such as the microprocessors mounted on PCB 74.

Referring now to FIG. 5, there is illustrated a rear, right perspective view of computer chassis 10 as similarly shown in FIG. 4. As depicted frame 30 further includes a base 84 and a center wall 82 which extends generally perpendicular from base 84 and generally separates compartments 68 and 34 of computer chassis 10.

As further illustrated in FIG. 5, computer chassis 10 includes a rear panel 86 which is inseparably attached to computer chassis 10. As described herein above, threaded fasteners 38 permit the tool-less securement and removal cooling fan assembly 80 within compartment 68 of computer chassis 10.

As further depicted in FIG. 5, rear panel 86 includes a number of ports or module slots to receive multiple computer components such as power supplies, cooling fans and the like. In this exemplary embodiment rear panel 86 is configured with three power supply bays 88, 90 and 92. A hot pluggable power supply 89 is illustrated inserted into bay 88. Rear panel 86 is also configured with opening 94 to provide access to the ports of the computer modules to be utilized in compartment 32 described herein above. Rear panel 86 also includes opening 96 providing access to the ports of the PCB 74 installed in compartment 68 of computer chassis 10. As is also depicted in this exemplary embodiment, rear panel 86 includes air vents 98 corresponding to the placement and installation of cooling fan assembly 80 in compartment 68 providing ventilation for the modules in compartment 68.

Still referring to FIG. 5, computer chassis 10 includes locking tabs 100 and 102 for receipt of a hot pluggable power supply security/locking bar as described below in FIG. 8. In addition an ejector/locking handle 104 is pivotally mounted onto the power supply in bay 88. This permits the hot installation and securement and the hot removal of power supplies into and out of the corresponding bays of computer chassis 10 without the need for tools, thereby further increasing the efficiency in which computer chassis 10 can be maintained and upgraded.

Figure 6:
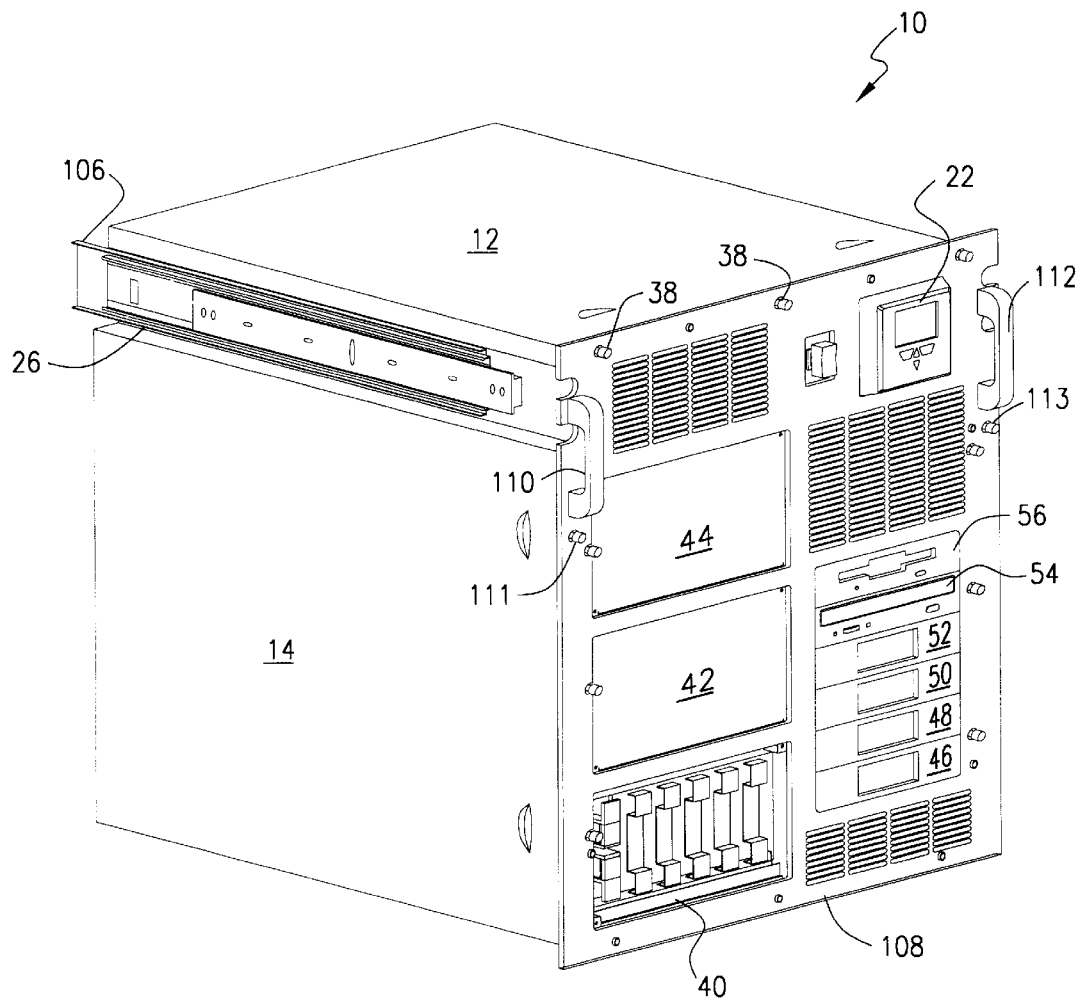
FIG. 6 is a frontal, left side perspective view of a computer chassis constructed in accordance with the principles of the present invention illustrating a configuration for rack mounting.
Figure 7:
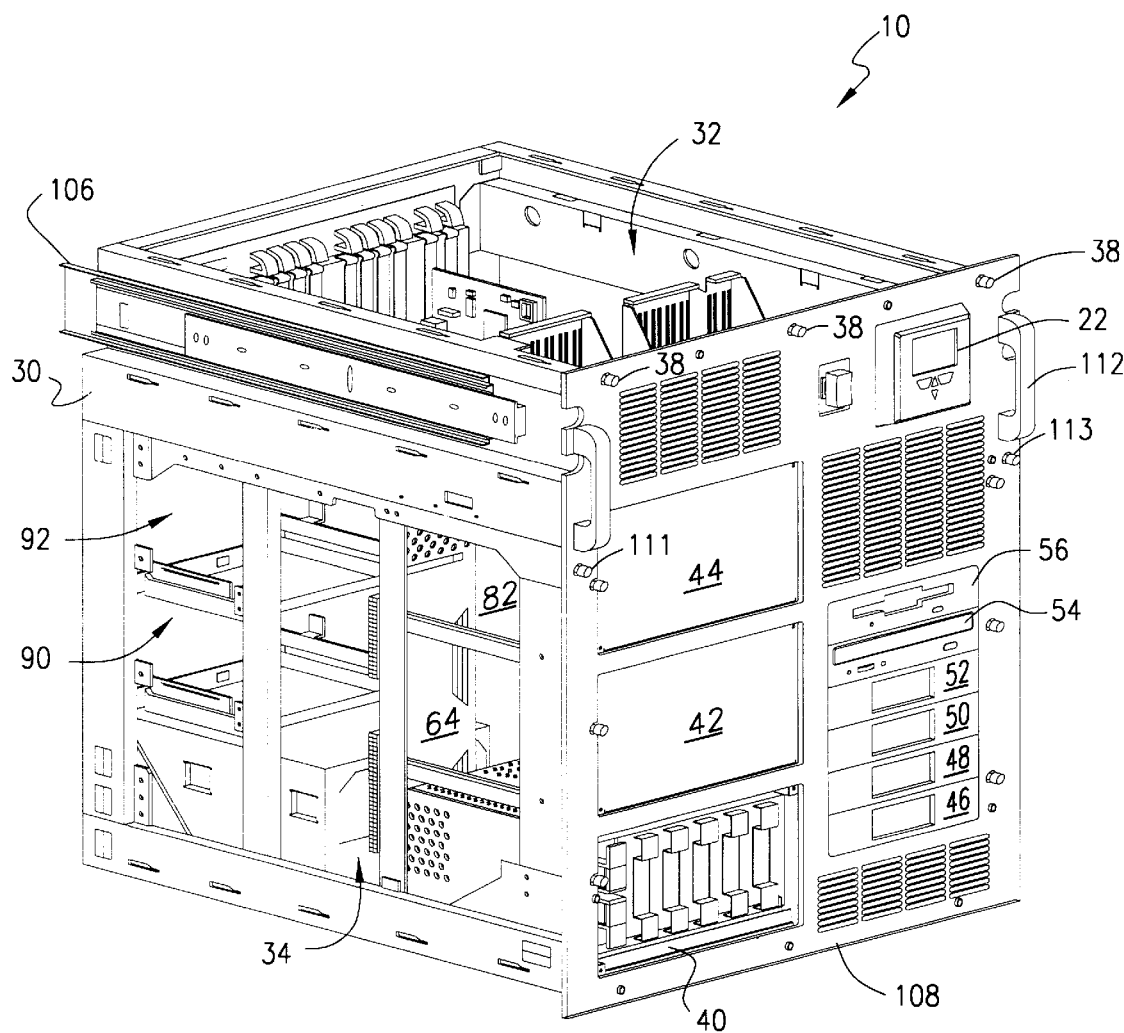
FIG. 7 is a frontal, left side perspective view of a the computer chassis of FIG. 6 with the top and side panel covers removed.

Referring now to FIGS. 6 and 7, there is illustrated a frontal, left perspective view of computer chassis 10 configured for rack mounting, with FIG. 7 having cover panels 12 and 14 removed. As depicted, casters 24 have been removed from the base of computer chassis and filler plate 28 has been removed from recess 26. A rack slide 106 has been attached in recess 26 to facilitate rack mounting. Similarly on the opposite side of computer chassis 10, filler plate 72 is also removed from recess 70, and a rack slide is added accordingly. As further depicted, front doors 16 and 18 have been removed, and a front rack plate 108 has been placed over and attached to front panel 36. Front rack plate 108 includes similar features as front panel 36, but also includes handles 110 and 112 to help in the sliding of computer chassis 10 into and out of the electronic rack enclosure system. Tool-less threaded fasteners 111 and 113 are utilized to secure computer chassis 10 to the electronic rack enclosure systems when computer chassis 10 has been properly slid into position therein. As illustrated, the orientation of computer chassis 10 is maintained constant whether configured in the rack configuration as shown in FIGS. 6 & 7 or in the mobile configuration as shown in FIGS. 1–5. It preferred that filler plates 28 and 72 be configured to be interchangeable to further reduce production and maintenance cost of computer chassis 10.

Figure 8:
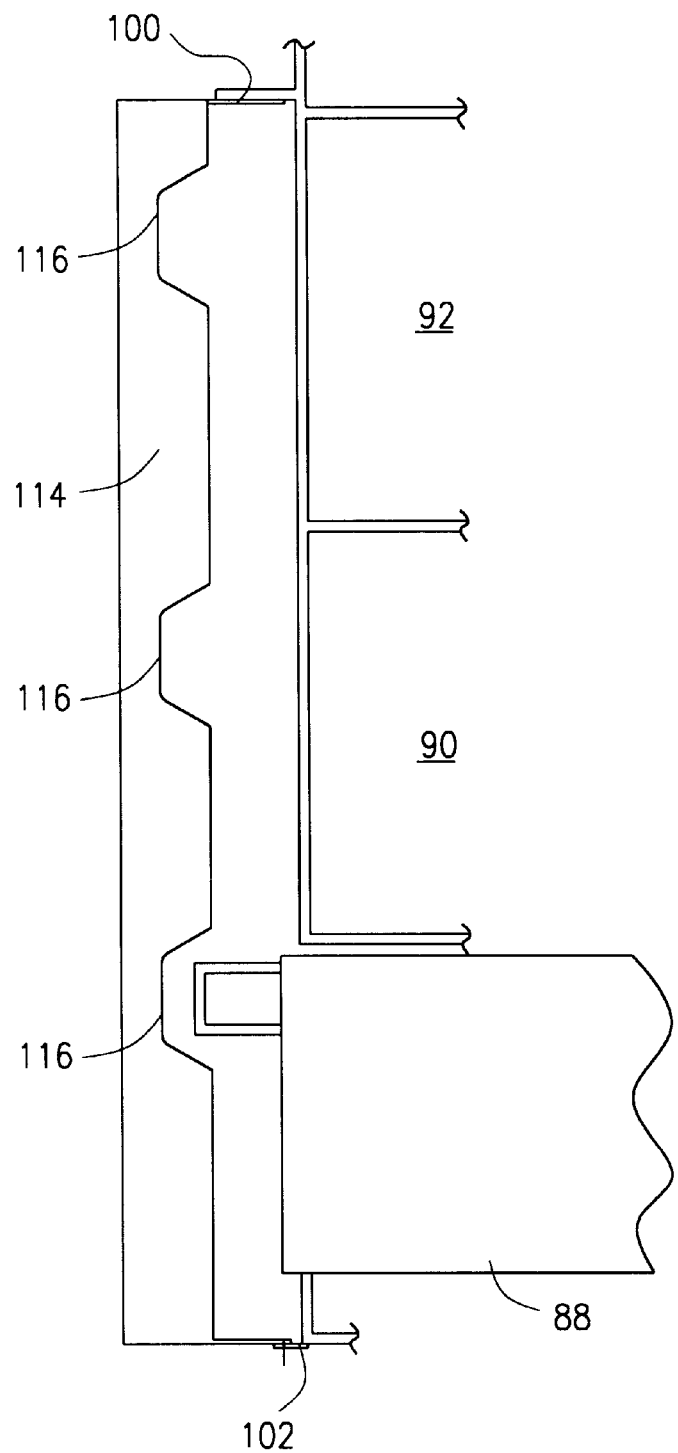
FIG. 8 is a side view of a locking/security mechanism constructed in accordance with the principles of the present invention.

Referring now to FIG. 8, there is illustrated a power supply security/locking bar 114 utilized to secure the hot pluggable power supplies which may be inserted into bays 88, 90 and 92. In particular, security/locking bar 114 is configured to connect to locking tabs 100 and 102, with notches 116 as spaced to correspond to ejector handles 104. Once security/locking bar 114 has been inserted into locking tabs 100 and 102, holes in both security/locking bar 114 and locking tab 100 are in alignments such that a lock can be inserted through the holes thereby securing and locking bar 114 to computer chassis 10. This prevents the unauthorized insertion and removal of power supplies with respect to computer chassis 10. In one exemplary embodiment, security/locking bar 114 can be secured to frame 30 and stored within one of the compartments such as compartment 32.

Figure 9:
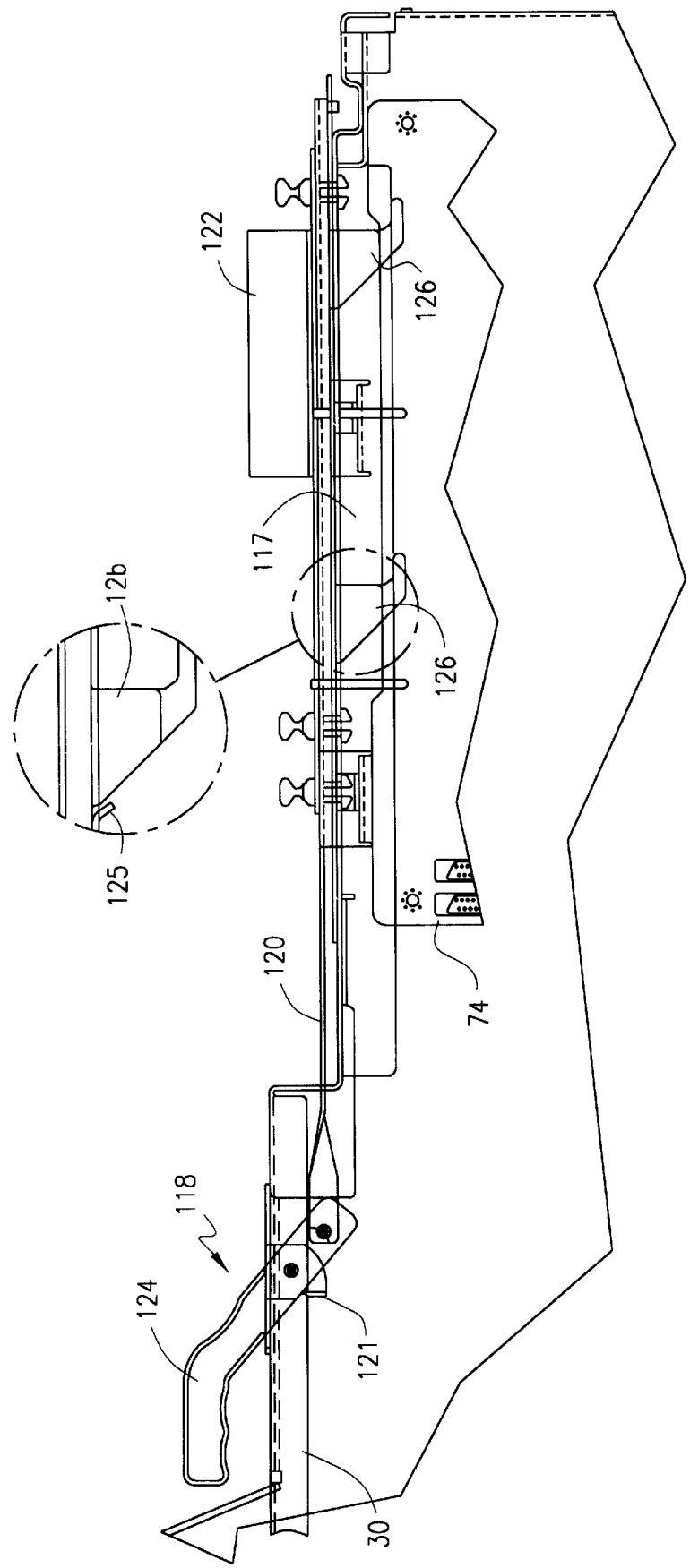
FIG. 9 is a partial side view of a slot board extractor constructed in accordance with the principles of the present invention.

Referring now to FIG. 9, there is illustrated a printed circuit board extractor 118 utilized in the present invention with a portion magnified to show greater detail of the ramp profiles. In one exemplary embodiment, PCB extractor 118 is attached to frame 30 intermediate compartment 32 and compartment 68. As described herein above, PCB 74 in compartment 68 interfaces with computer modules located within compartment 32. PCB extractor 118 includes a generally planar portion 120 with multiple ramp profiles 126 positioned on the bottom surface thereof. Portion 120 of PCB extractor 118 is positioned around the connection 117 between PCB 74 and module 122 and a handle portion 124 pivotally connected thereto. In operation handle portion 124 is lifted, thereby moving generally planar portion 120 towards handle portion 124. During this movement, ramp profiles 126 come into contact with rolled edges 125 of frame 30. As ramp profiles 126 continue to move up rolled edges 125, printed circuit board extractor 118 comes into contact with module 122. The upward force created by ramp profiles 126 moving up rolled edges 125 separate module 122 from PCB 74. This removes module 122 from PCB 74 without damaging module 122 or its interface connector 117 and further enables the removal of module 122 from PCB 74 without disturbing or removing PCB 74. Printed circuit board extractor 118 further includes a crank rotation stop 121 which comes into contact with handle 124 during the rotation thereof. Crank rotation stop 121 limits the movement of handle 124 and ramp profiles 126, and thereby limits the amount of lift provided by printed circuit board extractor 118.

Figure 11:
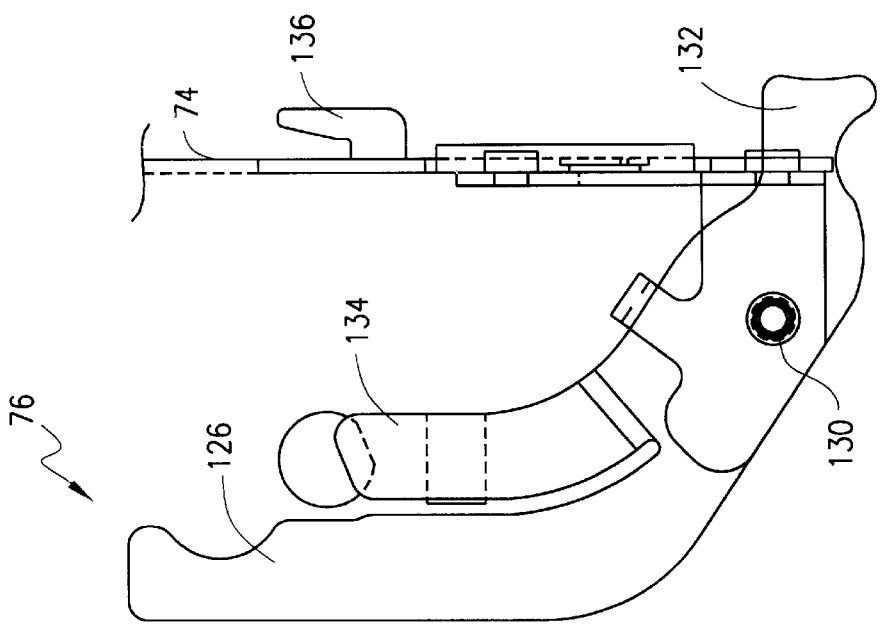
FIG. 11 is a side view of the printed circuit board inserter and extractor constructed as similarly shown in FIG. 10.
Figure 10:
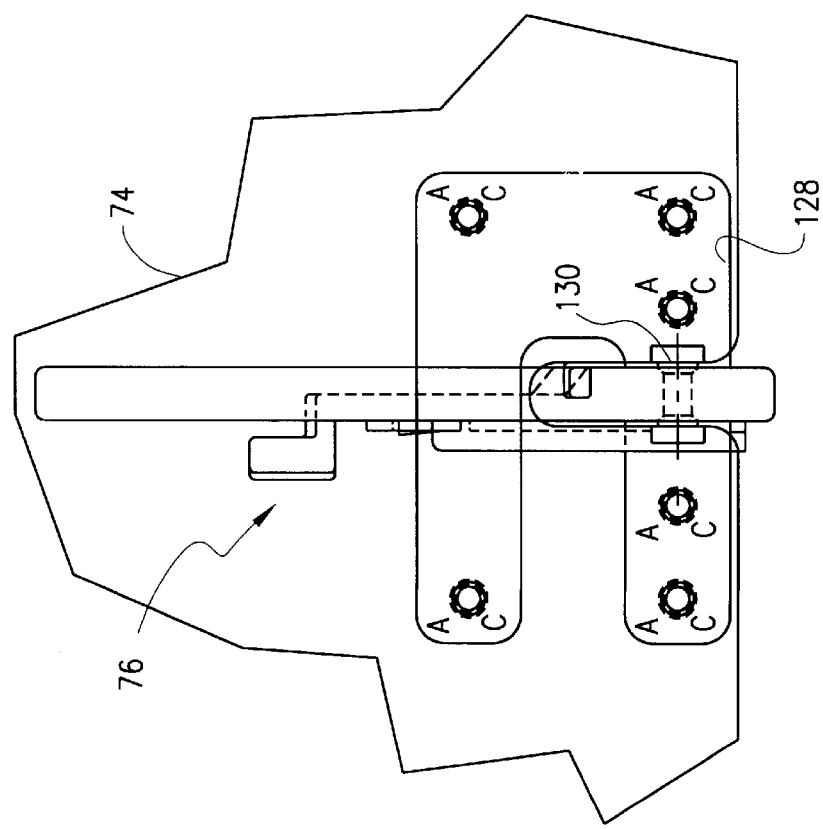
FIG. 10 is a generally planar view of a printed circuit board inserter and extractor constructed in accordance with the principles of the present invention.

Referring now to FIGS. 10 and 11, there is illustrated a more detailed view of the printed circuit board insertion/removal mechanism 76. As depicted, printed circuit board insertion/removal mechanism 76 includes a handle 126 which is pivotally connected to subpanel 128 at pivot 130. Subpanel 128 is secured to printed circuit board 74. Handle 126 includes an engagement portion 132 and facilitates the insertion and removal of printed circuit board 74 as described herein above. Printed circuit board insertion/removal mechanism 76 further includes a lock 134 for the securement of handle 126 upon the proper insertion of printed circuit board 74. In operation, to insert printed circuit board 74, engagement portion 132 is inserted into a hole or featured recess of the center wall 82 of frame 30. The handle 126 is rotated upward such that engagement portion 132 contacts wall 82 and exerts an upward force upon printed circuit 74, thereby inserting and installing printed circuit board 74 within compartment 68. The handle 126 is then locked using lock 134. To remove the printed circuit board 74, the handle 126 is released from lock 134. The handle 126 is rotated downward, such that engagement portion 132 engages wall 82, thereby exerting a downward force upon printed circuit board 74 and removing it from compartment 68. To further facilitate the installation of printed circuit board 74 with printed circuit board insertion/removal mechanism 76, locking tabs such as locking tab 136 are attached to the printed circuit board 74 and interface with corresponding slots on wall 82 of frame 30.

As described herein above, it is preferred that top panel 12, and side panels 14 and 66 be configured to be installable and removable without tools. This among other things reduces the amount of time needed to disassemble computer chassis 10 for repair and upgrades. It is further preferred that many of the computer components such as the power supplies, the disk drives and the fan assembly be installable and removable without tools to further facilitate the ease and quickness of repair, replacement and upgrades accordingly. It is also preferred that many of the computer components such as the disk drives and the power supplies be hot pluggable, i.e., can be removed and installed without powering down the system.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing form the spirit of the invention as set forth and defined by the following claims.

What is claimed is:

1. A modular computer chassis for both rack mounting and free standing use, said modular computer chassis comprising:
   a housing having a plurality of compartments for receiving modules therein, said housing further having a first side region such that at least one of said plurality of compartments is accessible through said first side region, said housing further adapted for rack mounting or free standing use;
   a first side cover panel for covering at least a portion of said first side region of said housing;
   means for attaching and removing said first side cover panel from said first side region of said housing without tools;
   means secured within at least one of said plurality of compartments for the receipt of a module therein; and
   at least one extractor device pivotally secured to said housing, said at least one extractor device having a generally planar ejector surface for facilitating the removal of a module from said at least one of said plurality of compartments.

2. The modular computer chassis as recited in claim 1, further comprising means for attaching and removing said module from said at least one of said plurality of compartments without tools.

3. The modular computer chassis as recited in claim 2, wherein said module attaching and removing means includes at least one handle pivotally secured to one of said modules and having a locking-ejecting portion for facilitating the attaching and removal of said module from said at least one of said plurality of compartments.

4. The modular computer chassis as recited in claim 1, wherein said first side cover panel attaching and removing means includes tool-less threaded fasteners.

5. The modular computer chassis as recited in claim 1, wherein said first side cover panel attaching and removing means includes tool-less quarter turn fasteners.

6. The modular computer chassis as recited in claim 1, wherein said housing further includes a second and third side regions such that at least one of said plurality of compartments are accessible through each of said second and third side regions.

7. The modular computer chassis as recited in claim 6, further comprising second and third side cover panels for covering said second and third side regions respectively; and
   means for attaching and removing each of said second and third side cover panels from said housing without tools.

8. The modular computer chassis as recited in claim 7, wherein said second and third side cover panels are interchangeable.

9. The modular computer chassis as recited in claim 2, wherein said means for attaching and removing said module includes at least one board inserting device pivotally secured to a first module for facilitating the connection.

10. The modular computer chassis as recited in claim 1, further comprising means for locking said module within said at least one of said plurality of compartments and for preventing the unauthorized removal therefrom, said locking means storable in one of said plurality of compartments.

11. The modular computer chassis as recited in claim 1, further comprising at least one door panel for affording limited access to said first side region, said at least one door panel hingedly mounted to said housing; and means for attaching and removing said at least one door panel from said housing without tools.

12. A modular computer chassis for both rack mounting and free standing use, said modular computer chassis comprising:

a housing having a plurality of compartments for receiving modules therein, said housing further having first and second side regions, front region, rear region, and top region such that at least one of said plurality of said compartments are accessible through each of said first and second side regions and said top region;

said housing further adapted for rack mounting or free standing use in the same orientation;

a plurality of covers for covering each of said first and second side regions, and said top region;

means for attaching and removing each of said plurality of covers to said housing without tools;

mount secured within at least one of said plurality of compartments for the receipt of a module therein;

at least one extractor device pivotally secured to said housing, said at least one extractor device having a generally planar ejector surface for facilitating the removal of a module from said at least one of said plurality of compartments; and at least one board inserting device pivotally secured to a first module for facilitating the connection, securement, and removal of the first module with respect to a second module within said housing.

13. The modular computer chassis as recited in claim 12, further comprising means for attaching and removing said module from within said mount without tools.

14. The modular computer chassis as recited in claim 13, wherein said modular attaching and removing means includes at least one ejector handle pivotally secured within said housing and having a generally planar ejector surface for facilitating the removal of said module from said at least one of said plurality of compartments.

15. The modular computer chassis as recited in claim 13, wherein said module attaching and removing means includes at least one handle pivotally secured to said housing and having an inserting-removing portion for facilitating the attachment and removal of said module from said at least one of said plurality of compartments, and further including a locking portion for securing said module within said at least one of said plurality of compartments.

16. The modular computer chassis as recited in claim 14, wherein said means for attaching and removing each of said plurality of covers to said housing without tools includes at least one tool-less threaded fastener and at least one tool-less quarter turn fastener.

17. The modular computer chassis as recited in claim 16, further comprising a vent hood hingedly mounted to said housing for directing air over a module in one of said plurality of compartments.

18. The modular computer chassis as recited in claim 17, further comprising first and second door panels for affording limited access to said frontal region, said first door panel including a lock therein for locking said first door panel with said second door panel to afford limited access to said front region; and means for attaching and removing said first and second door panels from said housing without tools.

19. A modular computer chassis for both rack mounting and free standing use, said modular computer chassis comprising:

a housing having a plurality of compartments for receiving modules therein, said housing further having first and second side regions, front region, rear region, and top region such that at least one of said plurality of said compartments are accessible through each of said first and second side regions and said top region;

said housing further adapted for rack mounting or free standing use in the same orientation;

a front panel for enclosing said front region, a rear panel for enclosing said rear region, a top cover for covering said top region, and first and second side covers for covering said first and second side regions;

a plurality of tool-less threaded fasteners for attaching and removing said first and second side covers from said housing;

a plurality of tabs extending from each of said first and second side covers and from said top cover, said housing including a plurality of slots corresponding to each of said plurality of tabs, said plurality of tabs for insertion into said plurality of slots for attaching and securing each of said first and second side covers and said top cover to said housing;

mount secured within at least one of said plurality of compartments for the receipt of a module therein; and at least one extractor device pivotally secured to said housing, said at least one extractor device having a generally planar ejector surface for facilitating the removal of a module from said at least one of said plurality of compartments.

* * * * *